(12) United States Patent
Lum et al.

(10) Patent No.: US 8,219,157 B2
(45) Date of Patent: Jul. 10, 2012

(54) ELECTRONIC DEVICE WITH SHARED MULTIBAND ANTENNA AND ANTENNA DIVERSITY CIRCUITRY

(75) Inventors: Nicholas W. Lum, Santa Clara, CA (US); Louie J. Sanguinetti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 12/412,228

(22) Filed: Mar. 26, 2009

(65) Prior Publication Data

US 2010/0248799 A1 Sep. 30, 2010

(51) Int. Cl.
*H04M 1/00* (2006.01)
(52) U.S. Cl. ...................................... 455/575; 455/553.1
(58) Field of Classification Search .................. 455/575, 455/553.1, 552.1, 426.1, 114.1, 127.4, 126, 455/115.1
See application file for complete search history.

(56) References Cited

U.S. PATENT DOCUMENTS

| | | | |
|---|---|---|---|
| 5,715,525 A | 2/1998 | Tarusawa et al. | |
| 5,794,159 A | 8/1998 | Portin | |
| 5,881,370 A | 3/1999 | Pottala et al. | |
| 6,553,210 B1 | 4/2003 | Lindemann et al. | |
| 6,560,443 B1 | 5/2003 | Vaisanen et al. | |
| 6,717,516 B2 | 4/2004 | Bridgelall | |
| 6,813,320 B1 | 11/2004 | Claxton et al. | |
| 6,882,631 B1 | 4/2005 | Tiedemann | |
| 7,106,816 B2 | 9/2006 | Filipovic | |
| 7,116,952 B2 | 10/2006 | Arafa | |
| 7,123,883 B2 | 10/2006 | Mages | |
| 7,155,178 B2 | 12/2006 | Chang et al. | |
| 7,251,499 B2 | 7/2007 | Ella et al. | |
| 7,313,368 B2 * | 12/2007 | Wu et al. ........................ 455/73 |
| 7,863,983 B2 | 1/2011 | Yuen et al. | |
| 7,872,547 B2 | 1/2011 | Song et al. | |
| 7,925,227 B2 * | 4/2011 | Ichitsubo .................. 455/114.1 |
| 2004/0232982 A1 | 11/2004 | Ichitsubo et al. | |
| 2006/0025171 A1 * | 2/2006 | Ly et al. ..................... 455/553.1 |
| 2006/0030265 A1 | 2/2006 | Desai et al. | |
| 2006/0145782 A1 | 7/2006 | Liu et al. | |
| 2006/0194538 A1 | 8/2006 | Palin et al. | |
| 2006/0205436 A1 | 9/2006 | Liu et al. | |
| 2006/0286942 A1 | 12/2006 | Okuyama | |
| 2008/0019341 A1 * | 1/2008 | Perlman ....................... 370/338 |
| 2008/0139118 A1 | 6/2008 | Sanguinetti et al. | |

(Continued)

OTHER PUBLICATIONS

ANADIGICS "AWL6254 Product Brief," Rev 1.2, Sep. 2005.

*Primary Examiner* — Joseph Lauture
(74) *Attorney, Agent, or Firm* — Treyz Law Group; G. Victor Treyz; David C. Kellogg

(57) ABSTRACT

Electronic devices are provided that contain wireless communications circuitry. The wireless communications circuitry may have antenna diversity circuitry that allows an optimum antenna in an antenna structure to be switched into use during device operations. The antenna structure may be shared between multiple radio-frequency transceivers in a radio-frequency transceiver circuit. The radio-frequency transceiver circuit may be coupled to the antenna structure using switching and filtering circuitry. The filtering circuitry may include a diplexer that divides radio-frequency signals into a divided signal path based on frequency. The filtering circuitry may also include bandpass filters that are interposed in each branch of the divided signal path. Switching circuitry in the switching and filtering circuitry may be used to selectively configure the wireless communications circuitry in transmit and receive modes using multiple communications bands.

24 Claims, 4 Drawing Sheets

U.S. PATENT DOCUMENTS

| | | | |
|---|---|---|---|
| 2008/0200148 A1* | 8/2008 | Fink | 455/411 |
| 2008/0212552 A1 | 9/2008 | Fukamachi et al. | |
| 2008/0233888 A1* | 9/2008 | Saliga | 455/73 |
| 2009/0289739 A1 | 11/2009 | Sasaki et al. | |
| 2010/0157860 A1 | 6/2010 | Hagiwara et al. | |
| 2011/0096763 A1 | 4/2011 | Qi et al. | |

* cited by examiner

ELECTRONIC DEVICE WITH SHARED MULTIBAND ANTENNA AND ANTENNA DIVERSITY CIRCUITRY

BACKGROUND

This relates generally to wireless communications circuitry, and more particularly, to electronic devices that support wireless communications in multiple communications bands.

Electronic devices such as handheld electronic devices are becoming increasingly popular. Examples of handheld devices include handheld computers, cellular telephones, media players, and hybrid devices that include the functionality of multiple devices of this type.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to reduce the number of components that are used. For example, in some wireless designs a single antenna is shared by two transceivers. Because there is only a single antenna with this type of approach, device size is minimized.

It can be difficult to share an antenna in a wireless device, however, because transceivers compete with each other for use of the antenna. This may lead to conflicts when both transceivers are being used.

It would therefore be desirable to be able to provide improved wireless communications circuitry for wireless electronic devices.

SUMMARY

Electronic devices such as handheld electronic devices and other portable electronic devices may be provided with wireless communications circuitry. The wireless communications circuitry may include transceiver circuitry such as transceivers operating at 2.4 GHz and 5 GHz. The wireless communications circuitry may also include cellular telephone transceivers and other radio-frequency transceivers.

An electronic device may be provided with an antenna structure for handling transmitted and received radio-frequency signals. The antenna structure may have multiple antennas. Each of the antennas in the antenna structure may cover multiple communications bands such as the 2.4 GHz and 5 GHz bands. An antenna diversity switch may be controlled in real time to switch one of the antennas in the antenna structure into use. For example, if a first of the antennas is receiving signals more effectively than a second of the antennas, the antenna diversity switch may be used to switch the first antenna in to use, thereby optimizing wireless performance.

The antenna structure may be shared between 2.4 GHz and 5 GHz transceivers using filter and switching circuitry. The filter and switching circuitry may include a diplexer that is coupled between first and second communications paths and the antenna diversity switch. The first path may be used to convey radio-frequency signals in a first communications band such as the 2.4 GHz communications band. The second path may be used to convey radio-frequency signals in a second communications band such as the 5 GHz communications band. The diplexer may be formed from a bandpass filter and a low pass filter. For example, the diplexer may have a 5 GHz bandpass filter that is coupled to the second path and a 2.4 GHz low pass filter that is coupled to the first path.

Bandpass filtering circuitry in the filter and switching circuitry may be interposed in the first and second paths. For example, a 2.4 GHz bandpass filter may be interposed in the first path between the transceiver circuitry and the diplexer, whereas a 5 GHz bandpass filter may be interposed in the second path between the transceiver circuitry and the diplexer.

Switching circuitry such as a two-position switch interposed in the second path and a three-position switch in the first path may be used to configure the device for various 2.4 GHz and 5 GHz transmission and reception modes. For example, the switching circuitry may be configured to support simultaneous signal transmission at 5 GHz and signal reception at 2.4 GHz or may be configured to support simultaneous signal reception at 5 GHz and signal transmission at 2.4 GHz (as examples).

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. Antenna resources in an electronic device may be shared between multiple transceivers. For example, a transceiver circuit that is operating in first and second communications bands may share an antenna. More than one antenna may be shared in this way. For example, multiple antennas may be used to implement an antenna diversity scheme in which switching circuitry continuously switches an optimum antenna into use depending on factors such as antenna signal strength. In an antenna diversity arrangement, multiple antennas are used to form a set of antennas. This antenna structure may be shared between multiple transceivers.

An electronic device may therefore be provided with an antenna structure and multiple transceivers that share the antenna structure. In the same electronic device, additional transceivers may be provided that use separate antennas. For example, an electronic device may contain antenna sharing circuitry that allows IEEE 802.11 (WiFi®) and Bluetooth® transceivers to share antenna resources. The same device may also be provided with additional transceivers such as a cellular telephone transceiver. The antenna sharing circuitry may contain filters that help block cross-talk from the cellular telephone transceiver and from leaked versions of transmitted signals while supporting antenna sharing operations between the WiFi and Bluetooth transceivers (as an example).

Any suitable electronic devices may be provided with wireless circuitry that supports antenna resource sharing. As an example, antenna sharing may be supported in electronic devices such as desktop computers, game consoles, routers, laptop computers, etc. With one suitable configuration, antenna sharing circuitry is provided in relatively compact electronic devices in which interior space is relatively valuable such as portable electronic devices.

Figure 1:
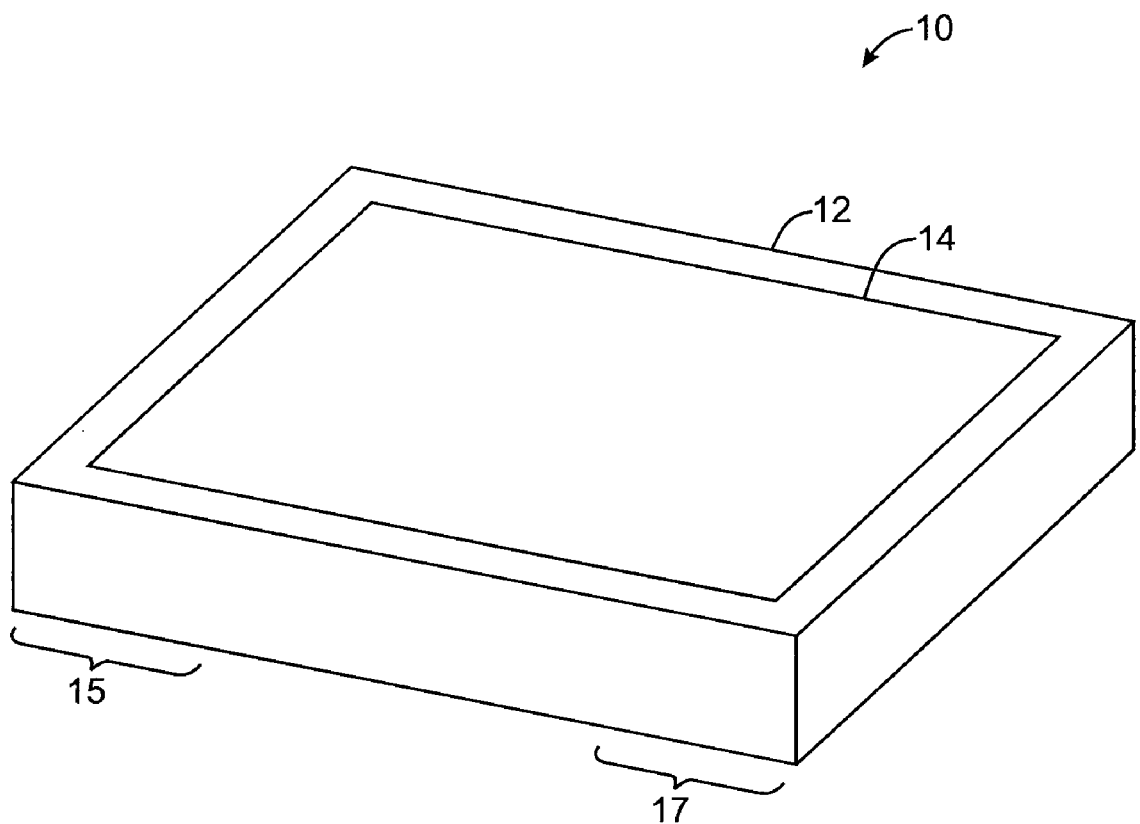
FIG. 1 is a perspective view of an illustrative electronic device with wireless communications circuitry in accordance with an embodiment of the present invention.

An illustrative portable electronic device in accordance with an embodiment of the present invention is shown in FIG. 1. Portable electronic devices such as illustrative portable electronic device 10 may be laptop computers or small portable computers such as ultraportable computers, netbook computers, and tablet computers. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices are handheld electronic devices such as cellular telephones.

Space is at a premium in portable electronic devices, so antenna-sharing arrangements for portable electronic devices can be particularly advantageous. The use of portable devices such as handheld devices is therefore sometimes described herein as an example, although any suitable electronic device may be provided with antenna resource sharing circuitry if desired.

Handheld devices may be, for example, cellular telephones, media players with wireless communications capabilities, handheld computers (also sometimes called personal digital assistants), remote controllers, global positioning system (GPS) devices, and handheld gaming devices. Handheld devices and other portable devices may be hybrid devices that combine the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples. Device 10 may be any suitable portable or handheld electronic device.

Device 10 includes housing 12 and includes at least one antenna for handling wireless communications. Housing 12, which is sometimes referred to as a case, may be formed of any suitable materials including, plastic, wood, glass, ceramics, metal, or other suitable materials, or a combination of these materials. In some situations, case 12 may be a dielectric or other low-conductivity material, so that the operation of conductive antenna elements that are located in proximity to case 12 is not disrupted. In other situations, case 12 may be formed from metal elements.

Any suitable type of antenna may be used to support wireless communications in device 10. Examples of suitable antenna types include antennas with resonating elements that are formed from a patch antenna structure, a planar inverted-F antenna structure, a helical antenna structure, etc. To minimize device volume, at least one of the antennas in device 10 may be shared between two transceiver circuits.

Handheld electronic device 10 may have input-output circuitry 14. Circuitry 14 may include devices such as a display screen, buttons, alphanumeric keys, touch pads, pointing sticks, and other user input control devices for receiving user input, and input-output components such as input-output ports. Device 10 may use any suitable type of display such as a liquid crystal display (LCD), an organic light-emitting diode (OLED) display, a plasma display, or multiple displays that use one or more different display technologies. Display screens can be mounted on the front face of handheld electronic device 10 as shown by circuitry 14 in FIG. 1. If desired, displays can be mounted on the rear face of handheld electronic device 10, on a side of device 10, on a flip-up portion of device 10 that is attached to a main body portion of device 10 by a hinge (for example), or using any other suitable mounting arrangement.

Device 10 may interact with external equipment wirelessly. If desired, antenna diversity arrangements may be implemented in device 10 in which multiple redundant antennas are used to transmit and receive signals. The antennas in an antenna diversity arrangement may be located in different portions of device 10. For example, a first antenna may be located in region 15, whereas a second antenna may be located in region 17. During operation of the wireless antennas, antenna diversity circuitry in device 10 may make signal strength readings or other appropriate readings in real time to continuously determine which antenna is performing best. The antenna diversity circuitry can then ensure that the optimum antenna is switched into use, maximizing wireless performance in device 10.

Figure 2:
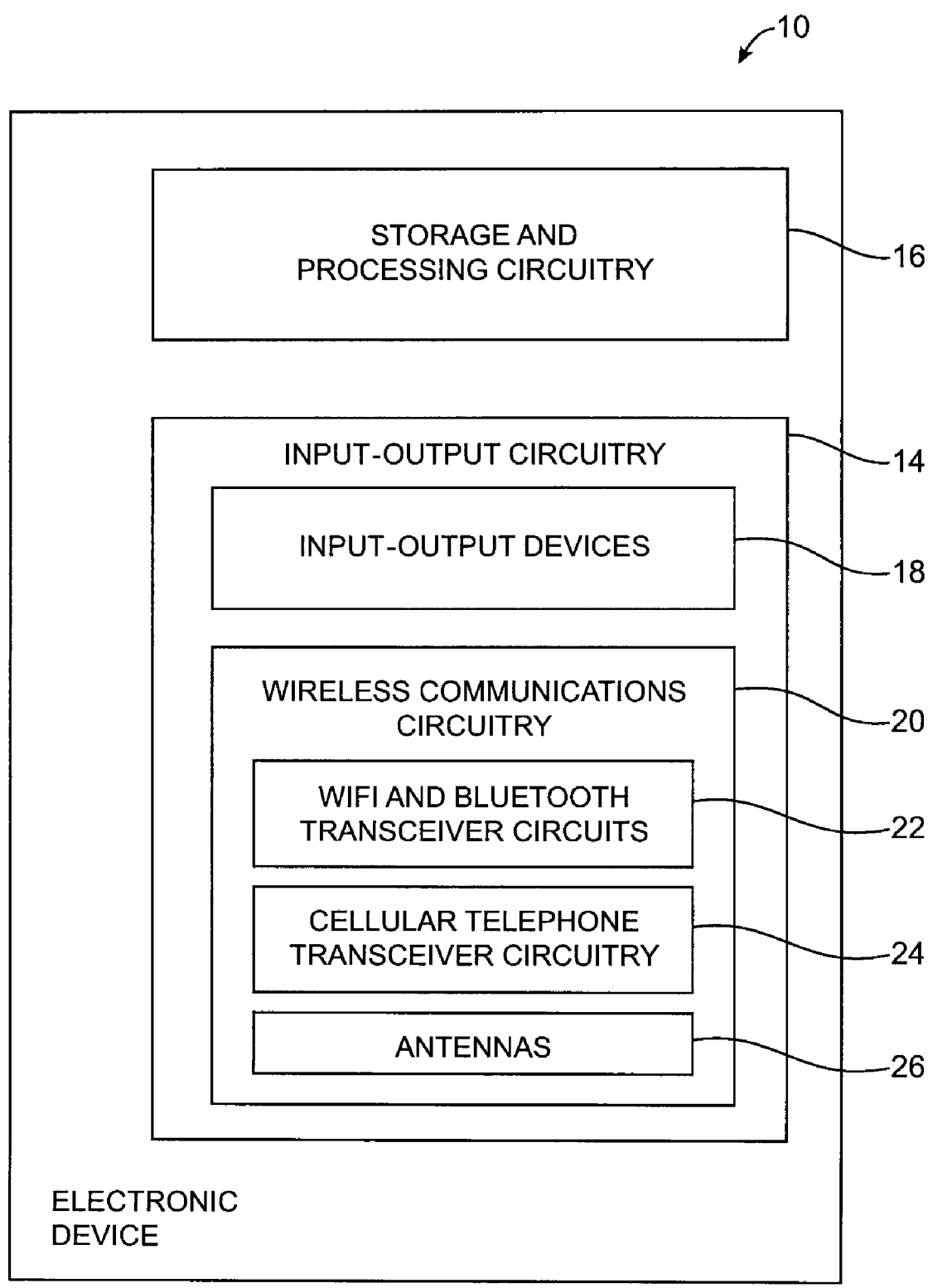
FIG. 2 is a schematic diagram of an illustrative electronic device with wireless communications circuitry in accordance with an embodiment of the present invention.

A schematic diagram of an embodiment of an illustrative handheld electronic device is shown in FIG. 2. Handheld device 10 may be a portable computer such as a portable tablet computer, a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 16 may be used to control the operation of device 10. Processing circuitry 16 may be based on a processor such as a microprocessor and other suitable integrated circuits. With one suitable arrangement, storage and processing circuitry 16 may be used to run software on device 10, such as internet browsing applications, voice-over-internet-protocol (VoIP) telephone call applications, email applications, media playback applications, operating system functions, etc. Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as WiFi®), protocols for other short-range wireless communications links such as the Bluetooth® protocol, etc.

Input-output devices circuitry 14 may be used to allow data to be supplied to device 10 and to allow data to be provided from device 10 to external devices. Input-output devices 18 such as touch screens and other user input interface are examples of input-output circuitry 14. Input-output devices 18 may also include user input-output devices such as buttons, joysticks, click wheels, scrolling wheels, touch pads, key pads, keyboards, microphones, cameras, etc. A user can control the operation of device 10 by supplying commands through such user input devices. Display and audio devices may be included in devices 18 such as liquid-crystal display (LCD) screens, light-emitting diodes (LEDs), and other components that present visual information and status data. Display and audio components in input-output devices 18 may also include audio equipment such as speakers and other devices for creating sound. If desired, input-output devices 18 may contain audio-video interface equipment such as jacks and other connectors for external headphones and monitors.

Wireless communications circuitry 20 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). Wireless communications circuitry 20 may include radio-frequency transceiver circuits for handling multiple radio-frequency communications bands. For example, circuitry 20 may include transceiver circuitry 22 that handles 2.4 GHz and 5 GHz bands for WiFi (IEEE 802.11) communications and the 2.4 GHz Bluetooth communications band. Circuitry 20 may also include cellular telephone transceiver circuitry 24 for handling wireless communications in cellular telephone bands such as the GSM bands at 850 MHz, 900 MHz, 1800 MHz, and 1900 MHz, and the 2100 MHz data band (as examples). Wireless communications circuitry 20 can include circuitry for other short-range and long-range wireless links if desired. For example, wireless communications circuitry 20 may include global positioning system (GPS) receiver equipment, wireless circuitry for receiving radio and television signals, paging circuits, etc. In WiFi and Bluetooth links and other short-range wireless links, wireless signals are typically used to convey data over tens or hundreds of feet. In cellular telephone links and other long-range links, wireless signals are typically used to convey data over thousands of feet or miles.

Wireless communications circuitry 20 may include antennas 26. Antennas 26 may be formed using any suitable antenna types. Examples of suitable antenna types for antennas 26 include antennas with resonating elements that are formed from patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link.

Examples of local wireless links include WiFi and Bluetooth links and wireless universal serial bus (USB) links. Because WiFi links are typically used to establish data links with local area networks, links such as WiFi links are sometimes referred to as WLAN links.

Local wireless links may operate in any suitable frequency band. For example, WLAN links may operate at 2.4 GHz and 5 GHz (as examples), whereas Bluetooth links may operate at 2.4 GHz. The frequencies of the WLAN channels that are used in supporting these local links in device 10 may depend on the country in which device 10 is being deployed (e.g., to comply with local regulations), the available hardware of the WLAN or other equipment with which device 10 is connecting, and other factors.

With one suitable arrangement, which is sometimes described herein as an example, device 10 includes long-range wireless circuitry such as cellular telephone transceiver circuitry 24 and short-range circuitry such as transceiver circuits 22. Circuitry 24 may operate with a single long-range link antenna (e.g., a multiband cellular telephone antenna). Circuitry 22 may support communications in both the 2.4 GHz and 5 GHz WiFi bands and in the 2.4 GHz Bluetooth band using a shared antenna or shared antennas.

In devices that do not have multiple antennas for implementing an antenna diversity scheme, circuitry 22 may include sharing circuitry that allows multiple transceiver circuits to share a single multiband antenna. For example, sharing circuitry may be used to allow a WiFi transceiver that operates at 2.4 GHz and at 5 GHz to share the same antenna as a Bluetooth transceiver that operates at 2.4 GHz.

The same type of sharing scheme may be implemented in devices 10 that have multiple antennas arranged to support an antenna diversity scheme. To support antenna diversity, multiple antennas are provided each of which may cover the same communications bands (e.g., bands at 2.4 GHz and 5 GHz). Antenna diversity switching circuitry may be used to switch an optimum one of the antennas into use at a given time. In a typical scenario, signal strength monitoring circuitry or other control circuitry may make measurements in real time to determine which of the antennas is providing the best performance (e.g., maximum signal strength) in the current environment for device 10. Based on these measurements, the control circuitry may direct the antenna diversity switching circuitry to switch the optimum antenna into use. As a user moves device 10 and covers various parts of device 10 with the user's hands, antenna performance may be degraded. With the antenna diversity scheme, the unblocked antenna (if available) is switched into use.

Device 10 may include sharing circuitry that allows multiple transceivers to share a single antenna or that allows multiple transceivers to share a single antenna structure containing multiple subantennas in a diversity arrangement. For clarity, the antenna sharing operations of device 10 are sometimes described in connection with arrangements in which the shared antenna structures include multiple antennas arranged in an antenna diversity configuration. This is, however, merely illustrative. Antenna sharing circuitry in device 10 may be used to allow any suitable transceivers to share any suitable antenna structures if desired.

With an illustrative antenna sharing arrangement, the shared antenna structures may be designed to operate at frequencies of both 2.4 GHz and 5 GHz, so the shared antenna structures are suitable for use with both the 2.4 GHz radio-frequency signals that are used in connection with both the WiFi and Bluetooth communications protocols and the 5 GHz radio-frequency signals that are used in connection with WiFi communications protocols.

Figure 3:
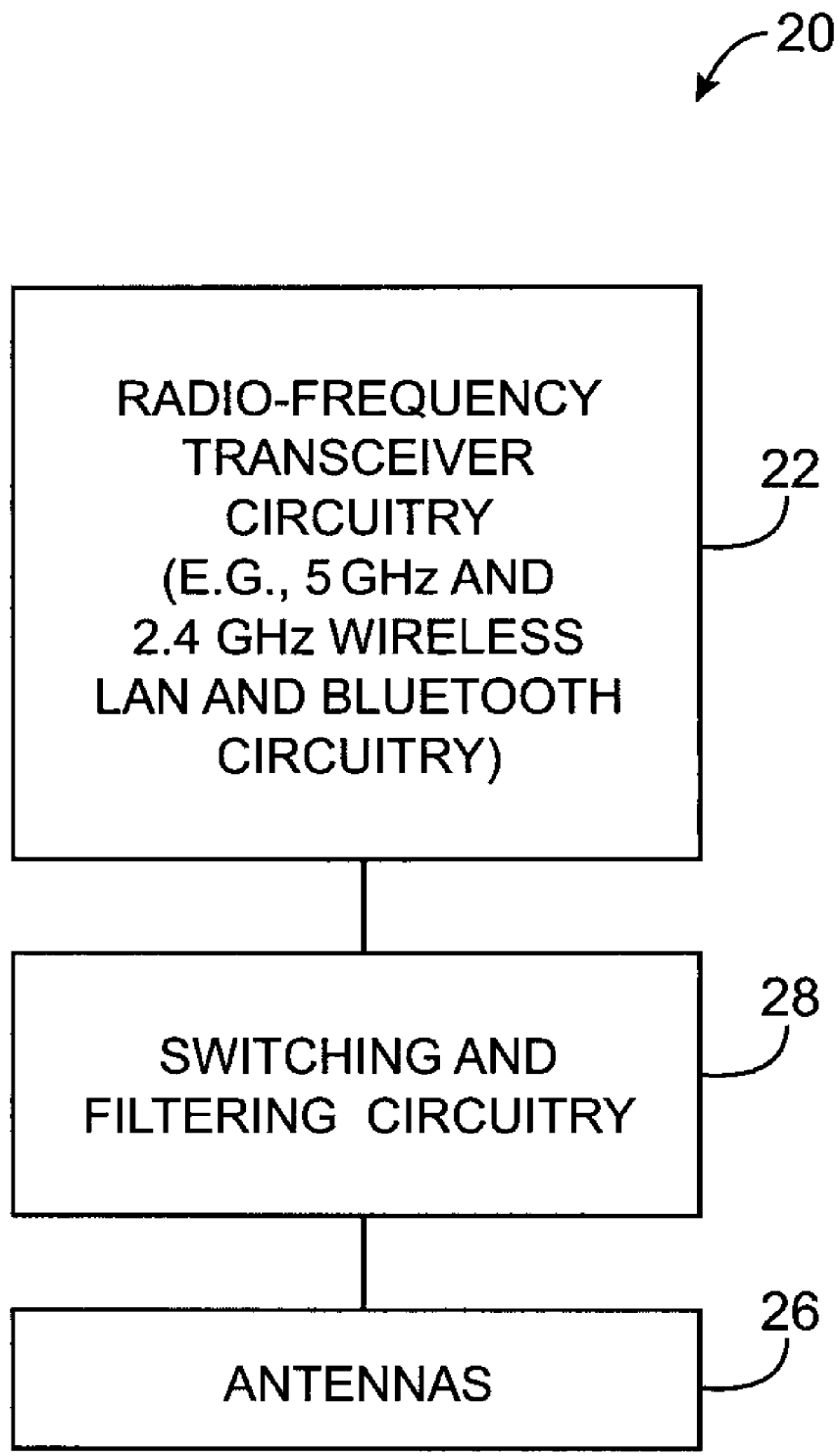
FIG. 3 is a schematic diagram of wireless communications circuitry for a wireless electronic device in accordance with an embodiment of the present invention.

FIG. 3 shows how wireless communications circuitry 20 may have switching and filtering circuitry 28. Switching and filtering circuitry 28 may include antenna sharing circuitry that selectively couples multiple transceivers in radio-frequency transceiver circuitry 22 to antennas 26. Radio-frequency transceiver circuitry 22 may include a WiFi transceiver (radio) for handling WiFi signals at 2.4 GHz and 5 GHz and a Bluetooth transceiver (radio) for handling Bluetooth signals at 2.4 GHz. These radios may be provided using a single integrated circuit or using two or more integrated circuits. Antennas 26 may include multiple antennas arranged in an antenna diversity configuration. Each of the multiple antennas may be configured to handle signals at 2.4 GHz and 5 GHz. Circuitry 28 may include switches such as transistorbased switches, amplifiers such as power amplifiers and low-noise amplifiers, discrete components such as inductors, capacitors, and resistors, etc.

Figure 4:
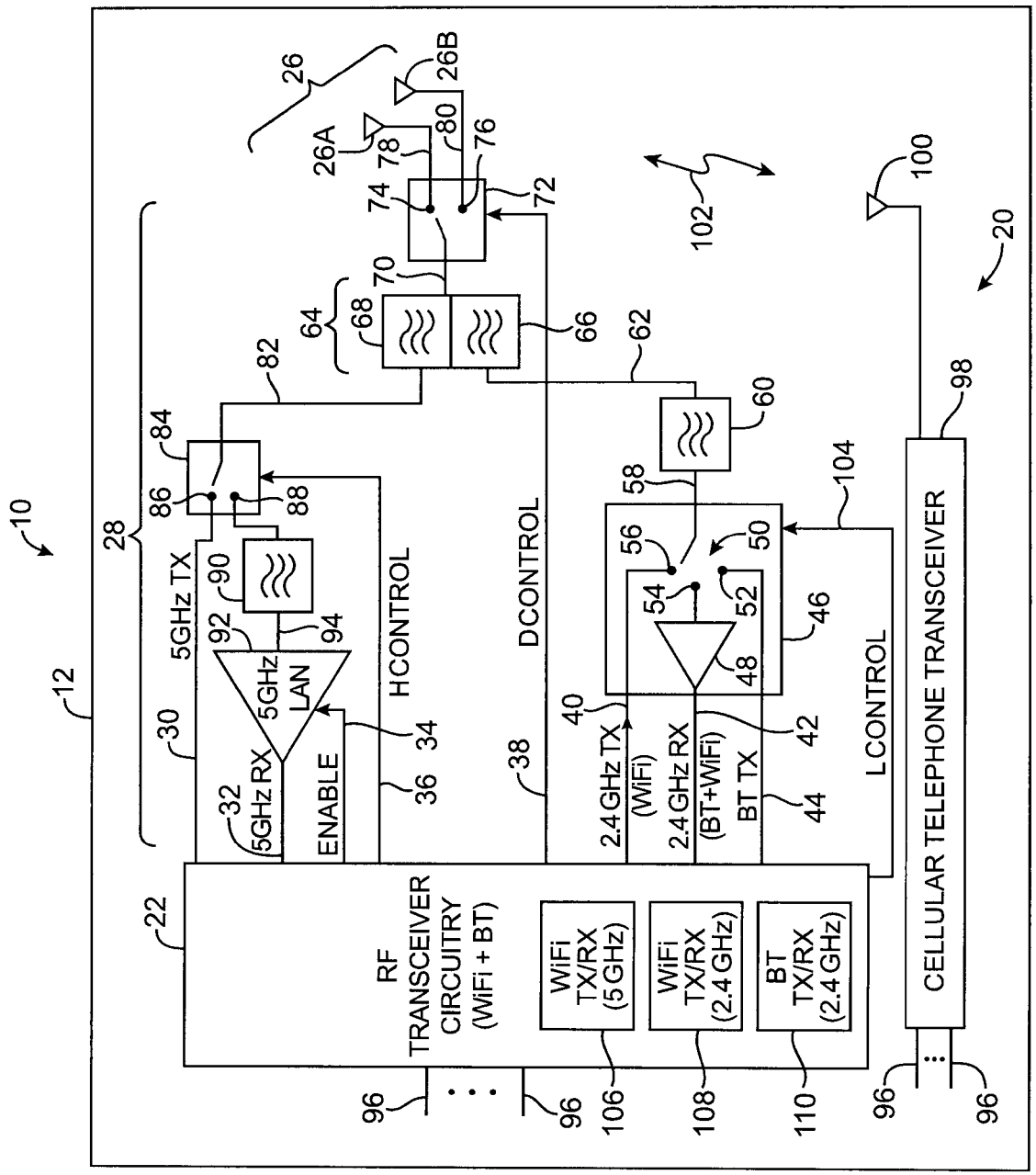
FIG. 4 is a detailed schematic diagram of wireless communications circuitry for a wireless electronic device in accordance with an embodiment of the present invention.

Illustrative wireless communications circuitry 20 is shown in FIG. 4. As shown in FIG. 4, circuitry 20 may include radio-frequency transceiver circuitry 22. Radio-frequency transceiver circuitry 22 may include WiFi and Bluetooth transceivers (as an example). The WiFi transceiver may operate in the 2.4 GHz WiFi communications band and the 5 GHz WiFi communications band. The Bluetooth transceiver may operate in the 2.4 GHz band. These transceiver circuits may be provided using one, two, three, or more than three transceiver circuits. In the example of FIG. 4, circuitry 22 is shown as containing a WiFi transceiver for 5 GHz operation (transceiver 106), a WiFi transceiver for 2.4 GHz operation (transceiver 108), and a Bluetooth transceiver for 2.4 GHz operation (transceiver 110). These circuits may be implemented using different portions of one or more integrated circuits and may be organized in a variety of configurations. For example, circuitry 22 may have a WiFi block or chip that serves to implement both 5 GHz and 2.4 GHz WiFi transceiver functions in a single transceiver circuit (as an example).

Circuitry 20 may also include other radio-frequency transceiver circuitry such as illustrative cellular telephone transceiver circuitry 98. Radio-frequency receivers and other circuits may be used to receive GPS signals, radio and video signals, other communications signals, etc. In the illustrative example of FIG. 4, circuitry 20 is depicted as containing radio-frequency transceiver circuitry 22 and radio-frequency transceiver circuitry 98. This is, however, merely illustrative. Wireless communications circuitry 20 may include any suitable wireless circuitry if desired.

Circuitry 22 and circuitry 98 may include resources that serve as control circuits and may therefore be considered to serve as some of the storage and processing circuitry that is depicted as storage and processing circuitry 16 of FIG. 2. Wireless communications circuitry 20 may also be interconnected with other storage and processing circuits.

For example, conductive paths 96 may be used to interconnect radio-frequency transceiver circuitry 22 and radio-frequency transceiver circuitry 98 to control circuitry in device 10 (e.g., storage and processing circuitry 16 of FIG. 2). Paths 96 may be used for power supply signals (e.g., one or more positive power supply voltages and one or more ground voltages), input and output data signals (e.g., general purpose input-output or GPIO signals), serial and parallel port signals (e.g., universal asynchronous receiver transmitter or UART signals), testing signals (e.g., testing signals compliant with Joint Test Action Group or JTAG protocols), pulse-code-modulation (PCM) signals (e.g., audio signals), WLAN data and Bluetooth data, clock signals, power management signals, other control and data signals, etc.

Radio-frequency transceiver circuitry 22 may transmit and receive radio-frequency signals using antennas 26. As shown in FIG. 4, circuitry 20 may include multiple antennas 26 that are arranged to implement an antenna diversity scheme. In the example of FIG. 4, antennas 26 include a first antenna such as antenna 26A and a second antenna such as antenna 26B. These antennas are connected to switching circuitry 72. Switching circuitry 72 may be controlled in real time to ensure that antenna performance is maximized. When, for example, antenna 26A is performing better than antenna 26B, switching circuitry 72 may be used to switch antenna 26A into use by radio-frequency transceiver circuitry 22. When antenna 26B is performing better than antenna 26A, antenna 26B can be used by radio-transceiver circuitry 22. Antennas 26A and 26B work together to handle signals for radio-frequency transceiver circuitry 22 and are sometimes collectively referred to as an antenna or antenna structure.

Radio-frequency transceiver circuitry 98 may transmit and receive radio-frequency signals using one or more antennas such as antenna 100. Particularly in compact electronic devices such as handheld electronic devices and other portable electronic devices, there is a relatively short distance between antenna 100 and antennas 26. This can result in potential cross-talk signals (e.g., when transmitted radio-frequency signals from antenna 100 are coupled to antennas 26 via free space path 102). Circuitry 20 may include switching and filter circuitry that effectively suppresses these sources of undesirable crosstalk and thereby ensures proper operation of radio-frequency transceiver circuitry 22 even when radio-frequency transceiver circuitry 98 is operated simultaneously.

Wireless communications circuitry 20 may include antenna sharing circuitry that allows antennas 26 to be shared by the WiFi and Bluetooth transceivers of circuitry 22. Circuitry 20 may include switching circuitry such as switches 84 and 50. The states of these switches may be adjusted during operation of circuitry 20 to route transmitted and received radio-frequency signals to appropriate locations.

Radio-frequency transceiver circuitry 22 may transmit signals in the 5 GHz WiFi band using output path 30. Path 30 may be connected to terminal 86 of switch 84. Terminal 88 of switch 84 may used to route incoming WiFi signals at 5 GHz to circuitry 22. These received WiFi signals may be routed to 5 GHz input path 32 of radio-frequency transceiver circuitry 22 via filter 90, path 94, and low-noise input amplifier 92. Low-noise amplifier 92 may be controlled by circuitry 22 using an enable signal "ENABLE" on line 34. When the signal ENABLE on line 34 is asserted by radio-frequency transceiver circuitry 22, low-noise amplifier 92 will be turned on. When not required to amplify incoming 5 GHz signals, low-noise amplifier 92 can be disabled to conserve power by deasserting the ENABLE signal. Bandpass filter 90 may pass frequencies in a band that overlaps the 5 GHz WiFi band. Bandpass filter 90 may, for example, pass frequencies that lie in a range of 4.9 GHz to 6 GHz.

Switch 84 may be used to connect path 82 to either terminal 86 or terminal 88 depending on the state of one or more control signals. These control signals may be provided to switch 84 from radio-frequency transceiver circuitry 22 over one or more control lines. These control lines and associated control signals are shown as control path 36 and control signal HCONTROL in FIG. 4. When path 82 is connected to terminal 86, 5 GHz WiFi signals can be transmitted from radio-frequency transceiver circuitry 22 using one of antennas 26. When path 82 is connected to terminal 88, 5 GHz WiFi signals that have been received using antennas 26 can be routed to radio-frequency transceiver circuitry 22.

Diplexer 64 serves as a frequency-dependent multiplexing element. Antennas 26 may receive signals at 2.4 and 5 GHz. The 5 GHz WiFi signals may be routed to path 82 by diplexer 64. The 2.4 GHz Bluetooth and WiFi signals may be routed to path 62 by diplexer 64.

Diplexer 64 may be implemented using any suitable radio-frequency components. With one suitable arrangement, diplexer 64 may be implemented using filters 68 and 66. Filter 68 may be a 5 GHz bandpass filter that passes radio-frequency signals in the range of 4.9 GHz to 6 GHz (as an example). Filter 66 may be a 2.4 GHz low-pass filter that passes radio-frequency signals at frequencies below 2.5 GHz (as an example). More extensive filtering may be performed using filter 60, which is connected to filter 66 by path 62. Filter 60 may be a 2.4 GHz bandpass filter that passes frequencies in the range of 2.4 GHz to 2.5 GHz (as an example). By using both filter 66 and filter 60 together, filtering for the 2.4 GHz signal path in circuitry 20 can be enhanced, without incurring large insertion losses. If desired, the filtering circuitry of bandpass filter 60 and low-pass filter 66 may be implemented using a unitary device, although this will typically result in a somewhat increased insertion loss penalty. In addition to exhibiting low insertion losses, the use of bandpass filter 60 may help to reduce leaked 5 GHz signals in diplexer 64 from propagating to the input of the 2.4 GHz receiver circuitry in circuitry 22 during 5 GHz transmission operations. The bulk (e.g., 90%) of the filtering performed by filters 60 and 66 with the FIG. 4 arrangement, will generally be provided by filter 60.

Filter 60 may be coupled to path 58. Path 58 may be used to route signals between filter 60 and switch 50. Switch 50 may be controlled by control signals LCONTROL on control path 104. Path 104 may include one or more control lines and may be used to route control signals to switch 50 from radio-frequency transceiver circuitry 22. These control signals can be used to adjust the position of switch 50 during operation of circuitry 22.

Switch 50 may be implemented as part of a larger circuit such as circuit 46. Circuit 46 may be, for example, an integrated circuit that contains an integrated low-noise radio-frequency input amplifier such as amplifier 48. Components such as these may also be provided using one or more separate devices. The arrangement of FIG. 4, in which low-noise amplifier 48 and switch 50 are implemented as parts of a common integrated circuit 46 is merely illustrative.

Switch 50 may be a three-position switch (as example). With a three-position configuration, switch 50 may be used to connect path 58 to terminal 56, terminal 54, or terminal 52. Control signals LCONTROL may be provided to switch 50 from radio-frequency transceiver 22 to select which of the three positions is used.

When it is desired to transmit 2.4 GHz WiFi signals, control signals LCONTROL on path 104 may be used to direct switch 50 to connect path 58 to terminal 56. In this configuration, 2.4 GHz WiFi signals that are transmitted on output path 40 by radio-frequency transceiver circuitry 22 may be routed to path 58. Signals at 2.4 GHz may be routed from antennas 26 to 2.4 GHz input path 42 by placing switch 50 in position 54 and routing incoming signals to path 42 through low-noise amplifier 48. Transceiver circuitry 22 (e.g., circuitry 22 and the code running on transceiver circuitry 22) may be used to process simultaneously received 2.4 GHz Bluetooth signals and 2.4 GHz WiFi signals on path 42. Transceiver circuitry 22 may, for example, separately process Bluetooth and WiFi signals, allowing for simultaneous receive operations. Bluetooth signals at 2.4 GHz may be transmitted from circuitry 22 by connecting path 58 to terminal 52 and Bluetooth output path 44. If desired, circuitry 20 may support simultaneous Bluetooth and WiFi transmission at 2.4 GHz (e.g., using a single output path and associated terminal in switch 50. This simultaneous transmission capability may be implemented by using radio-frequency transceiver circuitry that is capable of transmitting both 2.4 GHz WiFi and Bluetooth signals on the same output.

Antenna diversity switching circuitry 72 may be used to implement an antenna diversity scheme with multiple antennas 26. There may, in general, be any suitable number of antennas 26 coupled to diplexer 64 (e.g., one antenna, two antennas, three antennas, more than three antennas, etc.). In the example of FIG. 4, there are two antennas 26 that are coupled to diplexer 64. Antenna 26A is coupled to terminal 74 of switch 72 using path 78. Antenna 26B is coupled to terminal 76 of switch 72 using path 80. Switch 72 may be connected to diplexer 64 using path 70.

During operation, the control circuitry of transceiver circuitry 22 may produce control signals DCONTROL on one or more lines in control path 38. The control signals DCONTROL may be routed to the control input of switch 72 and may be used to control whether path 70 is connected to terminal 74 and path 78 or to terminal 76 and path 80. Antenna selection decisions may be based on received signal quality measurements (e.g., on a packet-by-packet basis) or any other suitable input. Based on this input, circuitry 22 may generate control signals DCONTROL that place switch 72 in a state that switches an optimum antenna into use (i.e., antenna 26A or 26B in the FIG. 4 example).

The illustrative architecture of FIG. 4 can be used to simultaneously implement antenna diversity and antenna sharing functions. Antenna diversity may be implemented by using switching circuitry 72 to switch either antenna 26A or 26B into use as appropriate to optimize signals strength. Antenna sharing may be implemented by using switching circuitry 84 and 50 and associated filter circuitry to selectively route 2.4 GHz and 5 GHz signals between the input-output ports associated with circuitry 22 and antennas 26. The use of this antenna sharing circuitry allows a single antenna structure (i.e., the diversity antenna implemented using antennas 26A and 26B) to be used for both 5 GHz and 2.4 GHz signals and to be used for both WiFi and Bluetooth traffic. Antennas 26A and 26B may each be implemented using multiband designs that cover both the 2.4 GHz and 5 GHz bands.

Because of the potential close proximity of other wireless components in housing 12 of device 10 such as cellular telephone transceiver 98 and cellular telephone antenna 100, there is a potential for undesirable radio-frequency interference with the 2.4 GHz and 5 GHz operations of circuitry 22. In particular, when a user is operating device 10 so that cellular telephone transceiver 98 is active, radio-frequency telephone signals from transceiver 98 may be coupled into antennas 26 via path 102. Even though antennas 26 are not nominally designed to handle cellular telephone frequencies, the close proximity of antenna 100 to antennas 26 may allow a non-zero amount of cellular telephone signals to be introduced onto path 70. These signals may be effectively eliminated using filtering circuitry such as the filtering circuitry of diplexer 64 and filtering circuitry 90 and 60. In particular, the use of bandpass filters 90 and 60 may reduce cellular crosstalk by 10-20 dB (for signals at frequencies from about 1800 MHz to 2100 MHz) to 50 dB (for signals at frequencies of about 850 MHz to 900 MHz).

Another source of crosstalk relates to the simultaneous presence of signals in both the 2.4 GHz and 5 GHz bands. When both the 2.4 GHz and 5 GHz bands are being used, there is a potential for a fraction of the transmitted signals to leak back to the input of circuitry 22.

For example, consider a scenario in which it is desired to transmit 2.4 GHz signals from circuitry 22 while receiving 5 GHz signals with circuitry 22. In this situation, 2.4 GHz signals will be transmitted to diplexer 64 via path 62, while switch 84 routes 5 GHz signals from diplexer 64 to path 32. During 2.4 GHz signal transmission operations such as these, there is a potential for a small amount of the transmitted 2.4 GHz signal to leak into the 5 GHz receive path. As when eliminating cellular telephone cross-talk, these crosstalk signals may be effectively eliminated using the bandpass filtering circuitry of FIG. 4. If, for example, there is −10 dBm of undesired 2.4 GHz leakage signal passed from diplexer 64 to switch 84, this leaked signal can be reduced in magnitude by filter 90 to a signal strength in the range of −20 dBm to −40 dBm at the output of filter 90 on path 94. This reduction in leaked signal magnitude will ensure that the 5 GHz receiver in circuitry 22 will not be overwhelmed with leaked 2.4 GHz signals when the 2.4 GHz transmitter is active during 5 GHz signal reception operations. Bandpass filter 60 is similarly used to reduce leakage at 5 GHz from overwhelming the 2.4 GHz signals that are received by transceiver circuitry 22 during 5 GHz transceiver operations.

Device 10 can therefore use circuitry 20 to support various operating modes in which 5 GHz WiFi signals are conveyed over antennas 26 while simultaneously handling 2.4 GHz signals. For example, 5 GHz WiFi signals may be transmitted by connecting switch 84 to terminal 86, while simultaneously receiving 2.4 GHz signals (e.g., for Bluetooth and/or WiFi) by connecting switch 50 to terminal 54. WiFi signals at 5 GHz may be received by connecting switch 84 to terminal 88, while simultaneously receiving 2.4 GHz signals (e.g., for Bluetooth and/or WiFi) by connecting switch 50 to terminal 54. WiFi operations at 5 GHz may also be supported simultaneously with 2.4 GHz WiFi transmission and 2.4 GHz Bluetooth transmission operations. For example, 5 GHz WiFi signals may be transmitted by connecting switch 84 to terminal 86, while simultaneously transmitting 2.4 GHz WiFi signals by connecting switch 50 to terminal 56. WiFi signals at 5 GHz may also be transmitted by connecting switch 84 to terminal 86, while simultaneously transmitting 2.4 GHz Bluetooth signals by connecting switch 50 to terminal 52. WiFi 5 GHz signals may be received by connecting switch 84 to terminal 88, while simultaneously transmitting 2.4 GHz WiFi signals by connecting switch 50 to terminal 56. WiFi signals at 5 GHz may also be received by connecting switch 84 to terminal 88, while simultaneously transmitting 2.4 GHz Bluetooth signals by connecting switch 50 to terminal 52. If desired, radio-frequency transceiver circuitry 22 with different input and output ports may be used to support additional operating modes. The arrangement of FIG. 4 is shown as an example. During all of these modes, circuitry 22 may control antenna diversity switching circuitry 72 in real time to implement an antenna diversity scheme using antennas 26A and 26B.

The foregoing is merely illustrative of the principles of this invention and various modifications can be made by those skilled in the art without departing from the scope and spirit of the invention.

What is claimed is:

1. Wireless communications circuitry comprising:
    a 5 GHz radio-frequency transceiver that operates in a 5 GHz communications band and a 2.4 GHz radio-frequency transceiver that operates in a 2.4 GHz band;
    an antenna; and
    circuitry that couples both the 5 GHz radio-frequency transceiver and the 2.4 GHz radio-frequency transceiver to the antenna and that routes transmitted 5 GHz signals from the 5 GHz radio-frequency transceiver to the antenna while simultaneously passing 2.4 GHz signals from the antenna to the 2.4 GHz radio-frequency transceiver.

2. The wireless communications circuitry defined in claim 1 wherein the antenna comprises a first antenna and wherein the wireless communications circuitry further comprises a second antenna and an antenna diversity switch that selectively switches one of the first and second antennas into use in response to antenna diversity control signals.

3. The wireless communications circuitry defined in claim 1 further comprises a cellular telephone transceiver.

4. The wireless communications circuitry defined in claim 1 wherein the circuitry comprises a diplexer coupled to the antenna, wherein the diplexer has a bandpass filter interposed between the antenna and the 5 GHz radio-frequency transceiver and has a low-pass filter interposed between the antenna and the 2.4 GHz radio-frequency transceiver.

5. The wireless communications circuitry defined in claim 4 further comprising:
    an input amplifier that receives the 2.4 GHz signals; and
    a 2.4 GHz bandpass filter that is coupled between the diplexer and the input amplifier.

6. An electronic device comprising:
    a housing;
    transceiver circuitry in the housing that handles wireless local area network radio-frequency signals at 5 GHz and radio-frequency signals at 2.4 GHz;
    an antenna in the housing that is used to simultaneously receive 5 GHz radio-frequency signals for the transceiver circuitry and transmit 2.4 GHz radio-frequency signals from the transceiver circuitry; and
    a cellular telephone transceiver and cellular telephone antenna in the housing.

7. The electronic device defined in claim 6 wherein the antenna comprises a first antenna, wherein the electronic device further comprises a second antenna, wherein the first and second antennas each cover 2.4 GHz and 5 GHz communications bands, wherein the electronic device further comprises a switch having a control input that receives antenna diversity control signals, and wherein the antenna diversity control signals direct the switch to switch either the first antenna or the second antenna into use.

8. The electronic device defined in claim 6 further comprising a diplexer interposed between the transceiver circuitry and the antenna.

9. The electronic device defined in claim 8 wherein the diplexer has terminals connected to:
    a 5 GHz path that conveys the 5 GHz radio-frequency signals;
    a 2.4 GHz path that conveys the 2.4 GHz radio-frequency signals; and
    an antenna path coupled to the antenna.

10. The electronic device defined in claim 9 further comprising a 5 GHz bandpass filter interposed in the 5 GHz path between the diplexer and the radio-frequency transceiver circuitry.

11. The electronic device defined in claim 8 wherein the diplexer is connected to a 5 GHz path that conveys the 5 GHz radio-frequency signals, a 2.4 GHz path that conveys the 2.4 GHz radio-frequency signals, and an antenna path coupled to the antenna and wherein the electronic device further comprises a 2.4 GHz bandpass filter interposed in the 2.4 GHz path and a 5 GHz bandpass filter interposed in the 5 GHz path.

12. The electronic device defined in claim 11 further comprising a two-position switch connected to 5 GHz bandpass filter and a three-position switch connected to the 2.4 GHz bandpass filter.

13. An electronic device comprising:
    an antenna;
    wireless communications circuitry that transmits and receives radio-frequency signals with the antenna, wherein the radio-frequency signals include radio-frequency signals in a first communications band and radio-frequency signals in a second communications band;
    a diplexer coupled between the antenna and the wireless communications circuitry, wherein the diplexer has terminals respectively connected to:
    a first path that conveys the radio-frequency signals in the first communications band;

a second path that conveys the radio-frequency signals in the second communications band; and an antenna path coupled to the antenna;

bandpass filter circuitry that is coupled between the diplexer and the wireless communications circuitry; and switching circuitry configurable in a first configuration in which the radio-frequency signals in the first communications band are transmitted by the wireless communications circuitry using the first antenna while the radio-frequency signals in the second communications band are received by the wireless communications circuitry using the first antenna.

14. The electronic device defined in claim 13 wherein the bandpass filter circuitry includes a first bandpass filter that passes radio-frequency signals in the first communications band and a second bandpass filter that passes radio-frequency signals in the second communications band.

15. The electronic device defined in claim 13 wherein the switching circuitry is operable to selectively route transmitted and received signals from the wireless communications circuitry to the diplexer.

16. The electronic device defined in claim 13 further comprising:

a first switch that is coupled to the transceiver circuitry and that conveys signals in the first communications band; and a second switch that is coupled to the transceiver circuitry and that conveys signals in the second communications band, wherein the bandpass filter circuitry comprises:

a first bandpass filter coupled between the diplexer and the first switch; and a second bandpass filter coupled between the diplexer and the second switch.

17. The electronic device defined in claim 16 wherein the diplexer comprises a diplexer bandpass filter that passes signals in the second communications band.

18. The electronic device defined in claim 17 wherein the diplexer comprises a low pass filter that passes signals in the first communications band.

19. The electronic device defined in claim 18 wherein the first communications band comprises a 2.4 GHz communications band, wherein the second communications band comprises a 5 GHz communications band, and wherein the switching circuitry is configurable in:

the first configuration in which 2.4 GHz signals are transmitted by the wireless communications circuitry through the first bandpass filter and the low pass filter while 5 GHz signals are received by the wireless communications circuitry through the diplexer bandpass filter and the second bandpass filter; and a second configuration in which 2.4 GHz signals are received by the wireless communications circuitry while 5 GHz signals are received by the wireless communications circuitry.

20. A portable electronic device, comprising:

an antenna structure having a first antenna and a second antenna;

an antenna diversity switch that selectively switches the first and second antennas into use in response to antenna diversity control signals;

radio-frequency transceiver circuitry that transmits and receives radio-frequency signals through the antenna diversity switch, wherein the radio-frequency signals include radio-frequency signals in a first communications band and radio-frequency signals in a second communications band;

a diplexer coupled between the antenna structure and the radio-frequency transceiver circuitry, wherein the diplexer has terminals respectively connected to:

a first path that conveys the radio-frequency signals in the first communications band;

a second path that conveys the radio-frequency signals in the second communications band; and an antenna path coupled to the antenna diversity switch;

a first bandpass filter that is interposed in the first path between the diplexer and the radio-frequency transceiver circuitry;

a second bandpass filter that is interposed in the second path between the diplexer and the radio-frequency transceiver circuitry;

a first switch that is interposed in the first path and that has at least three switch positions; and a second switch that is interposed in the second path.

21. The portable electronic device defined in claim 20 wherein the first bandpass filter comprises a 2.4 GHz bandpass filter.

22. The portable electronic device defined in claim 21 wherein the second bandpass filter comprises a 5 GHz bandpass filter.

23. The portable electronic device defined in claim 22 wherein the radio-frequency transceiver circuitry is configured to simultaneously receive 5 GHz signals through the second bandpass filter and transmit 2.4 GHz signals through the first bandpass filter.

24. The portable electronic device defined in claim 20 wherein the portable electronic device comprises a handheld electronic device that supports cellular telephone communications, the portable electronic device further comprising:

a cellular telephone transceiver.

* * * * *